United States Patent Office 2,833,983
Patented May 6, 1958

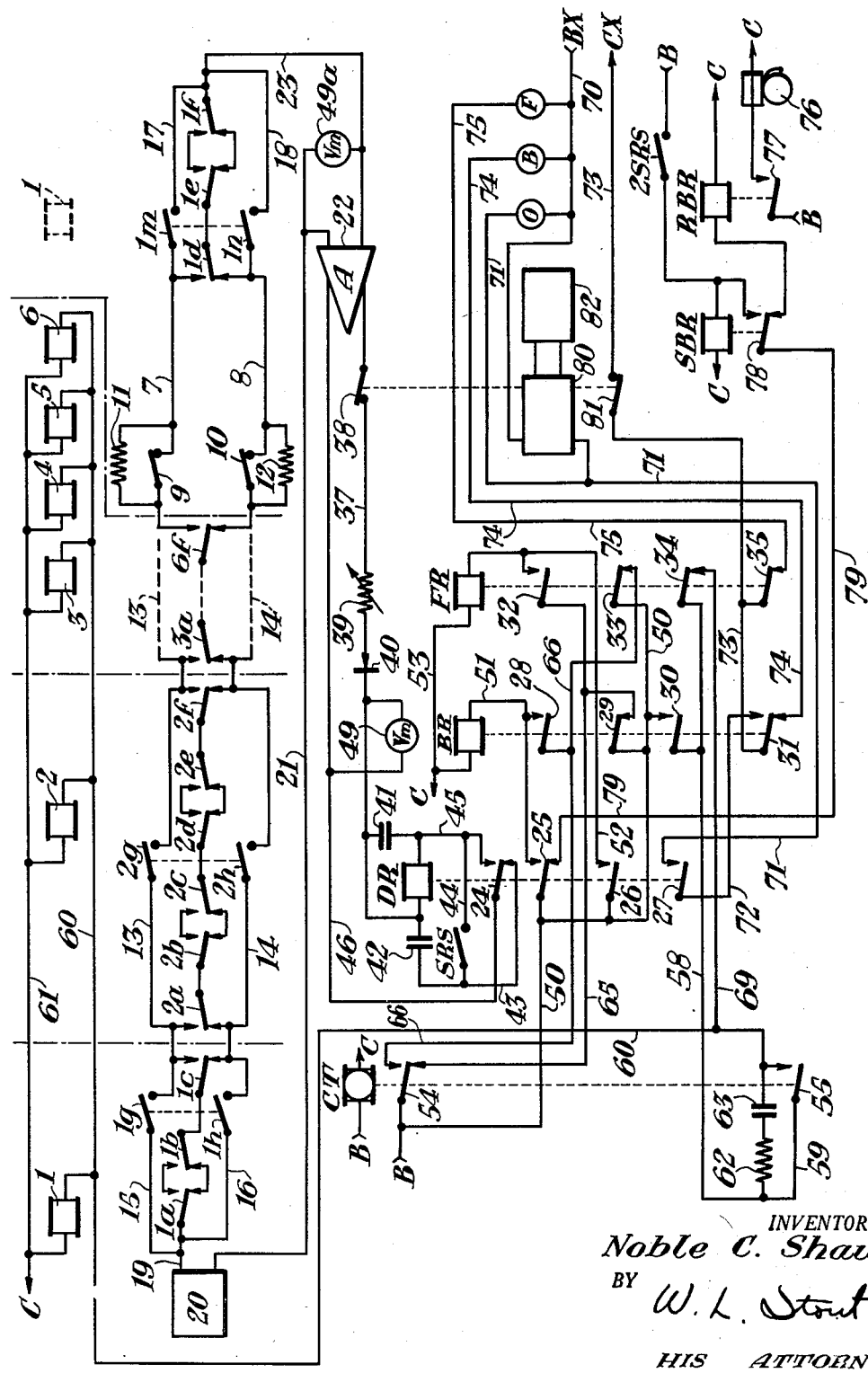

2,833,983

RELAY CONTACT TESTING CIRCUITS

Noble C. Shaw, Penn Township, Allegheny County, Pa., assignor to Westinghouse Air Brake Company, Wilmerding, Pa., a corporation of Pennsylvania Application May 23, 1956, Serial No. 586,833

14 Claims. (Cl. 324—28)

My invention relates to a relay testing circuit, and particularly to a circuit for testing the reliability of operation of relay contacts.

In the control of electronic equipment over relay contacts, it is important that only such relays are used wherein contact reliability is assured both as to the positive closure of the relay contacts and as to the response times of the contacts. In mass producing such control relays, the testing of the relays, particularly the testing of contact closure, presents a problem in that the testing of such relays should not lag behind the production, the testing of the relays being preferably done by mass production methods.

It is therefore an object of my present invention to provide a relay contact testing circuit whereby the contacts of a plurality of relays may be tested simultaneously, the contact failure of any one of the relays being indicated by visual and/or aural means.

Another object of my invention is to provide a relay contact testing circuit for a multiplicity of relays which comprises few and simple parts whereby highly sensitive adjustments of relatively insensitive components are possible and result in accurate supervision and control of the contacts under test.

Still another object of this invention is to provide a relay contact testing circuit for a multiplicity of relays wherein closure of the contacts and response times of the contacts of the relays under test are continuously tested, a contact of any relay failing to close or open positively or a contact sluggish in operation giving a failure indication.

In carrying out my invention, I provide a fast releasing control relay having predetermined values of voltage at which the armature is picked up and released. The relay is initially energized by a charge on a capacitor which is momentarily connected across the operating coil of the relay to initiate the testing cycle. The contacts of the relays under test are connected to form a chain of front contacts and a chain of back contacts, the chains being alternately connected into the input circuit of an amplifier. The output of the amplifier is connected across the operating coil of the fast releasing relay upon energization of the relay and disconnection of the capacitor. The output of the amplifier is so adjusted that the voltage applied across the relay coil is slightly higher than the release value of the relay. Thus any break in the continuity of the chains of front or back contacts of the relays or any change in the resistance of these chain circuits will reduce the amplifier output to deenergize the quick releasing relay. A second capacitor is also included in the circuit of the quick-releasing relay, the second capacitor determining the release response time of the relay. Thus in the case of sluggish operation of any of the contacts of the relays under test, the failure of the contacts to operate within a predetermined time will cause the deenergization of the quick releasing relay to give a failure indication.

My novel testing circuit also includes means to hold the relays under test in their energized or deenergized condition in which contact failure occurred. By the use of bridging circuits and shorting switches, the particular relay which failed in test may be quickly located.

Other objects and characteristic features of my invention will become apparent from the following description.

I shall describe one form of circuits embodying my invention, and shall then point out the novel features thereof in claims.

The accompanying drawing is a diagrammatic view illustrating a preferred form of my invention.

Referring to the drawing, the reference characters 1 to 6 designate relays undergoing tests, each of the relays in the embodiment illustrated comprising six front and six back contacts, the relay contacts being designated by the relay reference character followed by the subscripts $a$ to $f$, as, for example, $1a$, $1b$, $2a$, $2b$, etc., only the contacts of relays 1 and 2 being shown in detail, the connections of the contacts of relays 3 to 6, excepting for the first contact $3a$ and the last contact $6f$, being indicated by a dashed line in the drawing, it being understood that the contacts of relays 3, 4, 5 and 6 are connected in a chain in the manner illustrated for the contacts of relay 2. The relays 1 to 6 are plugged into a suitable panel (not shown), the panel being so wired that the front contacts of all the relays are connected in series and also all of the back contacts of the relays. For purposes hereinafter appearing, it will be noted that the contacts $1a$, $1b$ and $1c$ of relay 1 form the beginning of the chains of series-connected front and back contacts, while contacts $1d$, $1e$ and $1f$ of relay 1 form the ends of the contact chains. The front and back contacts $6f$ of relay 6 are connected by leads 7 and 8, respectively, through normally closed test switches 9 and 10 to the front and back contacts $1d$ of relay 1, the switches when closed shunting resistances 11 and 12, respectively. With the exception of the contacts for relay 1, the front contacts of relays 2 to 6 may be shunted by closing a normally open shorting switch $2g$ (to $6g$) connected into a lead 13 interconnecting the front contacts $a$ and $f$, respectively, of each relay. A similar shunting circuit for the back contacts of the relays 2 to 6 is also provided, a shorting switch $2h$ (to $6h$) being provided in a lead 14 interconnecting the back contacts $a$ and $f$ of the relays. The shorting switches for the series-connected chain of front and back contacts are ganged as indicated by the dashed line interconnecting the switches $2g$, $2h$.

The front contacts $1a$ to $1c$ of relay 1 are interconnected by a lead 15 having a normally open shorting switch $1g$ connected therein. The back contacts $1a$ to $1c$ are similarly interconnected by a lead 16 and a shorting switch $1h$. The front contacts $1d$ and $1f$ of relay 1 form the end of the chain and are interconnected by a lead 17 and a shorting switch $1m$, while back contacts $1d$ and $1f$ are interconnected by a lead 18 and a shorting switch $1n$. To shunt the front or back contacts of relay 1 it is therefore necessary to close both sets of ganged switches $1g$, $1h$ and $1m$, $1n$, whereas to shunt the contacts of relays 2 to 6 it is only necessary to close the respective ganged switches $2g$, $2h$ (to $6g$, $6h$).

The series-connected relay contact chains are connected by a lead 19 to a source of suitable voltage designated generally by the reference character 20. The voltage source 20 may be an A. C. or a D. C. source depending upon the operational characteristics of the relays to be tested, the voltage supplied in one particular application of my novel testing circuit being a 400 cycle A. C. low voltage, low current source. The voltage source 20 is connected by a lead 21 to the input of an amplifier 22, the other input terminal of the amplifier being connected by a lead 23 to the end of the relay contact chains. It will be obvious that with the front contacts or with the back contacts of all the relays closed, the voltage source 20 is connected to the input of the amplifier 22. Any break in the continuity of the contact chains will open the supply circuit for the amplifier. It will also be noted that with either of the test switches 9 or 10 open, the resistance 11 or 12 will be connected into the contact chains to increase the resistance of the amplifier input circuit resulting in a corresponding decrease in the amplifier output.

It will be noted that the leads 19 and 23 are connected to the heels of the switch arms engaging the front and back contacts 1a and 1f of the relay 1. This particular type of circuit connection permits the establishment of a continuous chain of only the front contacts, or of only the back contacts. It will be apparent that if the relay contacts were interconnected to form the proposed chains by interconnecting the heel of the last switch arm of the one relay to the heel of the first switch arm of the next adjacent relay, it would be possible to have a continuous chain established over the front contacts of one relay remaining energized for any reason and over the back contacts of the remaining relays which are deenergized. For this reason, therefore, the contacts of relay 1 are divided into two groups so that the chain connection from one relay to the next is over the front and back contacts of the adjacent relays.

The output of the amplifier 22 controls the operation of a quick releasing control relay DR which in turn controls the operation of relays BR and FR to indicate failure of the contacts of relays 1-6. The relay DR is provided with front and back contacts 24, 25 and with front contacts 26, 27. The energization of the control relay DR controls the operation of indicator relay BR and indicator relay FR over the front contact 25 and front contact 26, respectively, in a manner to be described. The indication relay BR is provided with a front contact 28, a back contact 29, a front contact 30 and back and front contacts 31. The indicator relay FR is provided with a front contact 32 and back contacts 33—35.

The amplifier output is connected by a lead 37 through a time controlled switch 38, a variable resistor 39 and a rectifier 40 to one side of the coil of relay DR and through a capacitor 41 to the other side of the relay coil. The lead 37 is further connected through a second capacitor 42 to the switch arm of a self-restoring switch SRS and by lead 43 to the back contact 24 of the control relay DR. The contact of switch SRS is connected by a lead 44 to the front contact 24 and by a lead 45 to the other side of the coil of relay DR and the capacitor 41. The other amplifier output terminal is connected via lead 46 to the switch arm of contacts 24.

The rectified output of the amplifier 22 is adjusted so that the charge on capacitor 42 which is connected to output lead 37 and through lead 43 and back contact 24 to output lead 46 is sufficiently high to energize the control relay DR when the capacitor is discharged through the relay coils. The momentary closing of the self-restoring switch SRS discharges the capacitor 42 through the relay coil, the opening of the switch SRS removing the capacitor from the circuit. The relay DR upon energization opens its back contacts 24 and 25 and closes its front contacts 24, 25, 26 and 27. The opening of the back contact 24 of the relay DR opens the charging circuit of the capacitor 42, but the closing of the front contact 24 provides a holding or stick circuit for the relay across the output terminals of the amplifier 22, the circuit being traceable from the lead 46 over the front contact 24, lead 45, through the relay coil to the amplifier lead 37. The amplifier output is so adjusted that when it is connected across the coil of relay DR the output voltage will drop to a value just above the release value of the relay. The value of the amplifier output may be periodically checked by means of a voltmeter 49 connected across the leads 37 and 46 of the amplifier. A voltmeter 49a may also be connected across the input leads 21 and 23 of the amplifier to check the input voltage of the circuit. The control relay DR will be held energized as long as the output of the amplifier does not fall below the predetermined value. Any slight reduction in the amplifier output will permit deenergization of relay DR, under which circumstances an alarm will be given, as will presently be described.

The energization of the relay DR will energize the indicator relays BR and FR over the front contacts 25 and 26, respectively. The energizing circuit for the indicator relay BR may be traced from the B terminal of a battery supply through a lead 50, over the front contact 25 of relay DR, through a lead 51, and through the coil of relay BR to the C terminal of the battery supply. The indicator relay FR is energized over a circuit which includes the lead 50, the front contact 26 of relay DR, and a lead 52 connected to one end of the coil of the relay, the other end of the coil being connected by a lead 53 to the C terminal of the battery supply.

Means are now provided to periodically energize and deenergize the relays 1-6 under test and to provide holding circuits for the indicator relays BR and FR should a back or front contact of the relays 1-6 fail for any reason or operate in a sluggish manner.

To this end there is provided a code transmitting relay CT which may be of the type described in Letters Patent of the United States No. 1,913,826 issued to Herman G. Blosser on June 13, 1933, the relay having back and front contacts 54 which are alternately opened and closed, and a front contact 55 which is closed and opened at a predetermined frequency when the relay is energized. Closure of the front contact 55 completes an energizing circuit for the coils of relays 1 to 6, the circuit being traceable from B supply lead 50 over front contact 30 of relay BR, through leads 58 and 59, over the front contact 55, through a lead 60 and through the coils of relays 1 to 6, to a lead 61 connected to the C terminal of the battery supply. A resistor 62 and a series-connected capacitor 63 forming an arc suppressor circuit are connected across the front contact 55. The coils of the relays 1-6 are thus energized periodically at a rate determined by the frequency of operation of the code transmitter relay CT, the front and back contacts of the relays under test being alternately opened and closed.

The alternate opening and closing of the front and back contact chains momentarily open the amplifier input circuit during the short transfer time while both the front and back contacts are opened. This does not interfere with the proper operation of the circuit. Should this transfer time be of any great duration due to sluggish operation of the tested relays, the relay DR will become deenergized to provide the failure indication as hereinafter described. The capacitor 41 across the coil of relay DR provides a proper time value in the release of the relay which in one particular method of operating the test circuit is .05 second. Thus the capacitor 41 permits operation of the circuit with slight interruptions but any interruption of the circuit for the preset time interval, as in the one case .05 second, or longer will permit the relay DR to become deenergized.

The code transmitter relay CT further serves to complete holding circuits for the relays BR and FR in the event of failure of any one of the contacts of the relays under test. The back contact 54 of relay CT is connected by a lead 65 to the back contact 29 of relay BR and to the switch arm of front contact 32 of relay FR. Thus with the back contact of relay CT closed and relay FR energized in the manner described over front contact 26 of relay DR, the front contact 32 of relay FR is closed to complete a holding circuit for the relay FR. Another holding circuit for the relay FR may be traced over the back contact 29 of relay BR and the front contact 32 of relay FR. The front contact 54 of code transmitter relay CT completes a holding circuit for relay BR through a lead 66 connected over the front contact 28 to the lead 51. Relay BR is also provided with a second holding circuit which may be traced from the B supply lead 50 over the back contact 33 of relay FR and the front contact 28 of the relay BR. Each of the relays BR and FR is provided with two possible holding circuits, one controlled by the code transmitter relay contacts and the other over a front contact of the one relay and a back contact of the other relay.

In case the front contact chain of the relays undergoing the test remains open a time interval equal to or greater than the time interval determined by the capacitor 41, the amplifier output circuit is interrupted sufficiently to permit the relay DR to become deenergized. At the time of front contact failure, the front contact 54 of the code transmitter relay is closed so that the holding circuit for the relay BR through lead 66 and over the front contact 28 of the relay BR is established. With interruption of the amplifier output, the relay DR is deenergized, opening the front contact 26 in the energizing circuit of relay FR. The relay BR being maintained energized will hold its back contact 29 open so that all holding circuits for the relay FR are open. The relay FR is thus deenergized to close its back contacts 33—35. Closing of the back contact 33 shunts B power supply connected to the front contact 54 of the code transmitter while the closing of the back contact 34 provides a shunt path bypassing the code transmitter front contact 55 to hold the relays 1–6 in their energized positions. The energizing shunt path for the relays under test may be traced from the B supply line 50, over the closed front contact 30 of relay BR and through the lead 58 to the closed back contact 34 of the relay FR, through a lead 69 and through the lead 60 to the coils of relays 1 to 6.

In the event a failure occurs in the back contact chain of the relays under test, the relay DR and the relay BR are deenergized while the relay FR is held energized. Deenergization of relay DR will open the energizing circuit of the relay BR at the front contact 25. The holding circuits previously described for the relay BR will also be opened upon back contact failure. The one holding circuit over the front contact 54 of the code transmitting relay CT and over the front contact 28 of relay BR will open since the front contact 54 is open at the time of failure. The other holding circuit over the front contact 28 and back contact 33 of relay FR is open at the back contact 33 since relay FR remains energized firstly over its front contact 32 and closed back contact 54 of the code transmitter, and then when back contact 54 opens, over its front contact 32 and back contact 29 of relay BR when relay BR is deenergized. Deenergization of relay BR will open its front contact 30 to open the energizing circuits over the code transmitter front contact 55 for the relays 1–6.

Means are now provided to indicate the operativeness or failure of the front and back contact chains of the relays under test and to provide a timing device for terminating the test of the relays after a predetermined time and for shutting down the apparatus in the event of a failure in the contact chains.

To this end there is provided three indicators O, B and F connected to a lead 70 which in turn is connected to the BX terminal of a suitable voltage supply. The indicators O, B and F may be either visual or aural and are herein illustrated as panel lights. The indicator light O is connected via lead 71 to the front contact 27 of the relay DR, the circuit for the light O being completed over the closed front contact 27, through a lead 72, over closed front contact 31 of relay BR and through a lead 73 to the CX terminal of the power supply. The light O will therefore be energized when relays DR and BR are energized, indicating the continuity of the test circuits described.

The light B is connected through a lead 74 to the back contact 31 of relay BR, the circuit for the light being completed over the closed back contact to the CX power lead 73. When relay BR is deenergized due to a failure in the back contact chain, the circuit for light O over the front contacts 27 and 31 of relays DR and BR is open and the circuit for light B completed to indicate the falure in the back contact chain. The light F is connected through a lead 75 to the back contact 35 of relay FR, the circuit for the light being completed over the closed back contact to the CX power lead 73. Upon failure of the front contact chain, the relays DR and FR are deenergized, front contact 27 being open to open the circuit for light O while back contact 35 is closed to complete the circuit for light F to indicate a failure in the back contact chain.

A further indication of a failure in the front and back contact chains, or of the malfunctioning of the test circuit, is provided by a signal device 76 herein illustrated as a bell. The bell 76 is operated over a front contact 77 of a relay RBR in an obvious circuit, the relay RBR being controlled over a back contact 78 of a relay SBR. The relay SBR is energized over an obvious circuit upon closing of the self-restoring switch 2SRS, a stick circuit for the relay being provided over the closed front contact 78 of the relay through a lead 79 to the back contact 25 of the DR relay, over the closed back contact to the B power lead 50. When relay DR becomes deenergized due to a failure in the contact chains, the relay RBR is energized over a circuit which may be traced from the B power lead 50, back contact 25 of relay DR, lead 79, back contact 78 of relay SBR and through the coil of relay RBR to the C terminal of power supply. The front contact 77 of relay RBR closes to operate the bell 76. To open the bell alarm circuit, the switch 2SRS is momentarily closed to energize the relay SBR, the back contact 78 opening to deenergize relay RBR. The relay SBR will be held energized upon opening of the switch 2SRS by the holding circuit over its closed front contact 78 and the closed back contact 25 of relay DR. Relay SBR will become deenergized upon energization of the relay DR, the holding circuit over back contact 25 being opened.

A time switch device 80 is also provided in the test circuit, the time switch device being connected in parallel with the indicator O across the lead 71 and the BX power lead 70. The time switch device controls the opening of the switch 38 in the amplifier output lead 37 and a switch 81 in the CX power lead 73. In operation of the test circuit the time switch device 80 may be set to open the test and indicator circuits after a predetermined time interval. In the event of a failure for any reason during the preset time, the deenergization of the DR relay will open the control circuit of the device to permit the opening of the control and indicator circuits at the time of failure. A time clock 82 connected in parallel with the time switch device may be used to give the elapsed time of circuit operation or the time of circuit failure.

With the failure of either the front or back contact chains indicated by the operation of either the light F or B, the particular relay developing the failure may be quickly located by closing the shorting switches 1g, 1h; 1m, 1n; 2g, 2h; etc. The closing of the shorting switches of the relay having the failure will shunt the contact chain of the particular relay to reestablish the continuity of the amplifier input circuit. The operativeness of the testing circuit may readily be established either by closing the starting switch SRS to energize the relay DR or by observing the readings of either of the voltmeters 49 or 49a. It should be noted that both sets of shorting switches for relay 1 must be closed to shunt all of the contacts of this relay. Operation of the circuit being reestablished with the particular shorting switches closed will indicate which of the relays caused the failure. The malfunctioning relay may then be replaced and the test continued.

An occasional check to see that a test will be terminated upon contact failure may be made by opening either of the test switches 9 or 10. Opening of the test switch 9 will insert the resistor 11 into the front contact chain, thereby reducing the amplifier input to a point where relay DR is deenergized. Opening of the test switch 10 will insert the resistor 12 into the back contact chain to deenergize the relay RD.

The testing circuit provided by me is simple and positive in its operation, the use of a charged capacitor for energizing the quick releasing relay RD, and maintaining the relay energized by the amplifier output voltage only slightly higher than the release value of the relay provides a very sensitive means for the detection of contact failures using only ordinary relays. Any change in the continuity of the front and back contact chains of the relays under test is instantly and positively indicated, the test circuit being such that the condition of failure is maintained in either the front or back contact chain and the test stopped at the point of failure so that the particular relay and contact failing may be readily ascertained.

Although I have herein shown and described only one form of a relay contact testing circuit embodying my invention, it is understood that various changes and modifications may be made therein within the scope of the appended claims without departing from the spirit and scope of my invention.

Having thus described my invention, what I claim is:

1. A circuit for testing the continuity of an electrical circuit having at least two series-connected contacts adapted to be alternately opened and closed simultaneously comprising, a control relay having predetermined pickup and release values of voltage, timing means associated with said relay to provide a predetermined release time for said delay, a source of energy, circuit means connected to said source through the circuit under test for energizing said relay at the predetermined pickup value of voltage, a holding circuit for said relay including said timing means and said circuit means to hold the relay energized by a voltage below the pickup value but above the release value of the relay, said relay becoming deenergized upon a failure in the continuity of the tested circuit for a period greater than the release time determined by said timing means, and means controlled by said relay to indicate the circuit failure.

2. A circuit for testing the continuity of an electrical circuit having at least two series-connected contacts adapted to be alternately opened and closed simultaneously comprising, a control relay having predetermined pickup and release values of voltage, an amplifier adapted to be connected to a source of energy through the electrical circuit under test, the voltage output of said amplifier being adjusted to a value higher than the release value but less than the pickup value of the relay, a capacitor chargeable by said amplifier to a voltage equivalent to the pickup value of said relay, means for momentarily connecting said capacitor across the control relay coil to energize said relay, a holding circuit for said relay including the output of the amplifier to hold said relay energized, said relay becoming deenergized upon a failure in the continuity of the circuit under test, and means controlled by said relay to indicate the circuit failure.

3. A circuit for testing the continuity of an electrical circuit having at least two series-connected contacts adapted to be alternately opened and closed simultaneously comprising, a control relay having predetermined pickup and release values of voltage, an amplifier adapted to be connected to a source of energy through the electrical circuit under test, the voltage output of said amplifier being adjusted to a value higher than the release value but less than the pickup value of the relay, a capacitor chargeable by said amplifier to a voltage equivalent to the pickup value of said relay, means for momentarily connecting said capacitor across the control relay coil to energize said relay, a holding circuit for said relay including the output of the amplifier to hold said relay energized, a second capacitor connected across the control relay coil for timing the release response of said relay, said relay becoming deenergized upon a failure in the continuity of the circuit under test for a period greater than the release time determined by the second capacitor, and means controlled by said relay to indicate the circuit failure.

4. A circuit for testing the continuity of an electrical circuit having at least two series-connected contacts adapted to be alternately opened and closed simultaneously comprising, a control relay having predetermined pickup and release values of voltage, a source of energy, an amplifier connected to said source through the electrical circuit under test, the output of said amplifier being adjusted to a voltage lower than the pickup value of said relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said relay closing to connect the control relay coil across the amplifier output to hold said relay energized, said relay becoming deenergized upon failure of the continuity of the circuit under test, and means for indicating the circuit failure.

5. A circuit for testing the continuity of an electrical circuit having at least two series-connected contacts adapted to be alternately opened and closed simultaneously comprising, a control relay having predetermined pickup and release values of voltage, an amplifier adapted to be connected to a source of energy through the electrical circuit under test, the output of said amplifier being adjusted to a voltage lower than the pickup value of said relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said relay closing to connect the control relay coil across the amplifier output to hold said relay energized, a second capacitor connectable across the control relay coil over the front contact of said relay for timing the release response of the relay, said relay becoming deenergized upon failure of the continuity of the circuit under test, and means for indicating the circuit failure for a period greater than the release time determined by the second capacitor.

6. A circuit for testing the contact operation of a multiplicity of relays, the front contacts and the back contacts of all the relays being series-connected to form two chains of contacts, comprising means for alternately and simultaneously energizing and deenergizing the relays to alternately close and open the front and back contacts of said relays, a control relay having predetermined pickup and release values of voltage, a source of energy, an amplifier connected to said source alternately through the front contact chain and the back contact chain of the relays under test, the voltage output of the amplifier being adjusted to a value less than the pickup value but greater than the release value of the relay, a capacitor chargeable by said amplifier to a voltage equivalent to the pickup value of the relay, a holding circuit for said relay including the amplifier output to hold said relay energized, said relay becoming deenergized upon failure in the continuity of a chain of relay contacts, and means controlled by said relay to indicate the failure.

7. A circuit for testing the contact operation of a multiplicity of relays, the front contacts and the back contacts of all the relays being series-connected to form two chains of contacts, comprising means for alternately and simultaneously energizing and deenergizing the relays to alternately close and open the front and back contacts of said relays, a control relay having predetermined pickup and release values of voltage, an amplifier adapted to be connected to a source of energy alternately through the front contact chain and the back contact chain of the relays under test, the voltage output of the amplifier being adjusted to a value less than the pickup value but greater than the release value of the relay, a capacitor chargeable by said amplifier to a voltage equivalent to the pickup value of the relay, a holding circuit for said relay including the amplifier output to hold said relay energized, a second capacitor connected across the control relay coil for timing the release response of said relay, said relay becoming deenergized upon failure in the continuity of a chain of relay contacts for a period greater than the release time determined by the second capacitor, and means controlled by said relay to indicate the failure.

8. A circuit for testing the contact operation of a multiplicity of relays having all of their front contacts series-connected in a chain and all of their back contacts series-connected in a second chain, comprising means for alternately and simultaneously energizing and deenergizing the multiplicity of relays, a control relay having predetermined pickup and release values of voltage, a source of energy, an amplifier alternately connected to said source through the front contact chain and the back contact chain of the relays, the output of said amplifier being adjusted to a voltage lower than the pickup value of said relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said control relay closing to connect the control relay coil across the amplifier output, said relay becoming deenergized upon continuity failure in a relay contact chain, and means for indicating the circuit failure.

9. A circuit for testing the contact operation of a multiplicity of relays having all of their front contacts series-connected in a chain and all of their back contacts series-connected in a second chain, comprising means for alternately and simultaneously energizing and deenergizing the multiplicity of relays, a control relay having predetermined pickup and release values of voltage, an amplifier adapted to be alternately connected to a source of energy through the front contact chain and the back contact chain of the relays, the output of said amplifier being adjusted to a voltage lower than the pickup value of said relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said control relay closing to connect the control relay coil across the amplifier output, a second capacitor connectable across the control relay coil over the front contact of said relay for timing the release response of the relay, said relay becoming deenergized upon continuity failure in a relay contact chain for a period greater than the release time determined by the second capacitor, and means for indicating the circuit failure.

10. A circuit for testing the contact operation of a multiplicity of relays having their front contacts series-connected in a chain and their back contacts series-connected in a second chain, comprising a control relay having predetermined pickup and release values of voltage, a source of energy, means for simultaneously energizing and deenergizing said multiplicity of relays, an amplifier alternately connected to said source through the front contact and back contact chains, the output of said amplifier being adjusted to a voltage lower than the pickup value of said control relay but higher than the release value thereof, a capacitor connectable over a back contact of the control relay across the output of said amplifier and chargeable to a voltage equivlent to the pickup value of the control relay, means for momentarily connecting the charged capacitor across the control relay coil to energize said relay to open said back contact, a front contact of said control relay closing to connect the control relay coil across the amplifier output, a first indicator relay and a second indicator relay, front contacts controlled by said control relay to energize said first and second indicator relays, said control relay becoming deenergized upon failure in a relay contact chain, means for holding one of said indicator relays energized in accordance with the particular chain of contacts failing, and means controlled by the deenergized indicator relay to indicate the chain of contacts in which the fault occurs.

11. A circuit for testing the contact operation of a multiplicity of relays having their front contacts series-connected in a chain and their back contacts series-conected in a second chain, comprising a control relay having predetermined pickup and release values of voltage, means for simultaneously energizing and deenergizing said multiplicity of relays, an amplifier adapted to be alternately connected to a source of energy through the front contact and back contact chains, the output of said amplifier being adjusted to a voltage lower than the pickup value of said control relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said control relay closing to connect the control relay coil across the amplifier output, a second capacitor connectable across the control relay coil over the front contact of said relay for timing the release response of the relay, a first indicator relay and a second indicator relay, front contacts controlled by said control relay to energize said first and second indicator relay, said control relay becoming deenergized upon failure in a relay contact chain for a period greater than the release time determined by the second capacitor, means for holding one of said indicator relays energized in accordance with the particular chain of contacts failing, and means controlled by the deenergized indicator relay to indicate the chain of contacts in which the fault occurs.

12. A circuit for testing the contact operation of a multiplicity of relays having their front contacts series-connected in a chain and their back contacts series-connected in a second chain, comprising a control relay having predetermined pickup and release values of voltage, a source of energy, a code transmitter relay alternately closing and opening its front and back contacts at a predetermined frequency, said multiplicity of relays being simultaneously energized and deenergized over a contact of said code transmitter, an amplifier alternately connected to said source through the front contact and back contact chains, the output of said amplifier being adjusted to a voltage lower than the pickup value of said control relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said control relay closing to connect the control relay coil across the amplifier output, a first indicator relay and a second indicator relay, means controlled by said control relay to energize said first and second indicator relays; holding circuits for said first indicator relay controlled by said first and second indicator relays, and by said first indicator relay and the code transmitter relay; holding circuits for said second indicator relay controlled by said first and second indicator relays, and by said second indicator relay and the code transmitter relay; said control relay becoming deenergized upon failure in a relay contact chain, one of said indicator relays being deenergized, the other of said indicator relays remaining energized over its holding circuits, means controlled by said first and second indicator relays for maintaining the multiplicity of relays energized when failure occurs in the front contact chain, means controlled by said first indicator relay for maintaining said multiplicity of relays deenergized when failure occurs in the back contact chain, and means controlled by said first and second indicator relays to indicate the chain of contacts in which the fault occurs.

13. A circuit for testing the contact operation of a multiplicity of relays having their front contacts series-connected in a chain and their back contacts series-connected in a second chain, comprising a control relay having predetermined pickup and release values of voltage, a code transmitter relay alternately closing and opening its front and back contacts at a predetermined frequency, said multiplicity of relays being simultaneously energized and deenergized over a contact of said code transmitter, an amplifier adapted to be alternately connected to a source of energy through the front contact and back contact chains, the output of said amplifier being adjusted to a voltage lower than the pickup value of said control relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said control relay closing to connect the control relay coil across the amplifier output, a second capacitor connectable across the control relay coil over the front contact of said relay for timing the release response of the relay, a first indicator relay and a second indicator relay, means controlled by said control relay to energize said first and second indicator relays; holding circuits for said first indicator relay controlled by said first and said second indicator relays, and by said first indicator relay and the code transmitter relay; holding circuits for said second indicator relay controlled by said first and second indicator relays; and by said second indicator relay and the code transmitter relay; said control relay becoming deenergized upon failure in a relay contact chain for a period greater than the release time determined by the second capacitor, one of said indicator relays being deenergized and the other of said indicator relays remaining energized over its holding circuits, means controlled by said first and second indicator relays for maintaining the multiplicity of relays energized when failure occurs in the front contact chain, means controlled by said first indicator relay for maintaining said multiplicity of relays deenergized when failure occurs in the back contact chain, and means controlled by said first and second indicator relays to indicate the chain of contacts in which the fault occurs.

14. A circuit for testing the contact operation of a multiplicity of relays having their front contacts series-connected in a chain and their back contacts series-connected in a second chain, comprising a control relay having predetermined pickup and release values of voltage, a source of energy, a code transmitter relay alternately closing and opening its front and back contacts at a predetermined frequency, said multiplicity of relays being simultaneously energized and deenergized over a contact of said code transmitter, an amplifier alternately connected to said source through the front contact and back contact chains, the output of said amplifier being adjusted to a voltage lower than the pickup value of said control relay but higher than the release value thereof, a first capacitor connectable over a back contact of the control relay across the output of said amplifier and chargeable to a voltage equivalent to the pickup value of the control relay, means for momentarily connecting the charged first capacitor across the control relay coil to energize said relay to open said back contact, a front contact of said control relay closing to connect the control relay coil across the amplifier output, a second capacitor connectable across the control relay coil over the front contact of said relay for timing the release response of the relay, a first indicator relay and a second indicator relay, front contacts controlled by said control relay to energize said first and second indicator relays, holding circuits for said first indicator relay over its own front contact and a back contact of said second indicator relay and over its own front contact and a front contact of the code transmitter relay, holding circuits for said second indicator relay over its own front contact and a back contact of the first indicator relay and over its own front contact and a back contact of the code transmitter relay, said control relay becoming deenergized upon failure in a relay contact chain for a period greater than the release time determined by the second capacitor, one of said indicator relays being deenergized upon opening of the front contacts of the control relay, the other of said indicator relays remaining energized over the closed contact of the code transmitter relay and then over the closed back contact of the other indicator relay upon deenergization thereof, a front contact of said first indicator relay and a back contact of said indicator relay maintaining the multiplicity of relays energized when failure occurs in the front contact chain, said front contact of said first indicator relay maintaining said multiplicity of relays deenergized when failure occurs in the back contact chain, and means controlled by said first and second indicator relays to indicate the chain of contacts in which the fault occurs.

References Cited in the file of this patent

UNITED STATES PATENTS

| | | |
|---|---|---|
| 2,452,942 | Lord et al. | Nov. 2, 1948 |
| 2,478,946 | Rose | Aug. 16, 1949 |
| 2,496,622 | Dubuar | Feb. 7, 1950 |
| 2,764,715 | Lorenz | Sept. 25, 1956 |